United States Patent [19]
Birka et al.

[11] Patent Number: 5,580,109
[45] Date of Patent: Dec. 3, 1996

[54] BUMPER FASCIA SUPPORT, BUMPER FASCIA SUPPORT AND REINFORCEMENT ASSEMBLY, AND BUMPER ASSEMBLY

[75] Inventors: Mark P. Birka, Northville; Gerald C. Dermidoff, Sterling Heights, both of Mich.

[73] Assignee: Chrysler Corporation, Highland Park, Mich.

[21] Appl. No.: 283,416

[22] Filed: Aug. 1, 1994

[51] Int. Cl.$^6$ ................................................ B60R 19/24
[52] U.S. Cl. .......................................... 293/120; 293/155
[58] Field of Search ................................. 293/102, 120, 293/121, 122, 155

[56] References Cited

U.S. PATENT DOCUMENTS

| | | | |
|---|---|---|---|
| 3,692,345 | 9/1972 | Dumontier | 293/71 R |
| 4,193,621 | 3/1980 | Peichl et al. | 293/142 |
| 4,348,042 | 9/1982 | Scrivo | 293/120 |
| 4,474,395 | 10/1984 | Harloff et al. | 293/120 |
| 4,542,925 | 9/1985 | Huber et al. | 293/120 |
| 4,652,032 | 3/1987 | Smith | 293/120 |
| 4,652,036 | 3/1987 | Okamoto et al. | 296/15 |
| 5,108,138 | 4/1992 | Kawaguchi | 293/120 |
| 5,226,695 | 7/1993 | Flint et al. | 293/121 X |
| 5,326,142 | 7/1994 | Dodds et al. | 293/155 X |

FOREIGN PATENT DOCUMENTS

| | | | |
|---|---|---|---|
| 1035216 | 10/1955 | France . | |
| 2361156 | 12/1973 | Germany . | |
| 3-224849 | 10/1991 | Japan . | |
| 2071583 | 9/1981 | United Kingdom | 293/120 |

*Primary Examiner*—David M. Mitchell
*Assistant Examiner*—Kia M. Robinson
*Attorney, Agent, or Firm*—Margaret A. Dobrowitsky

[57] ABSTRACT

One embodiment is a bumper fascia support for supporting a motor vehicle bumper fascia wherein the bumper fascia generally has a C-shaped transverse cross-section with an upper skirt and a lower skirt. The bumper fascia support has a front side and a back side relative to its position on the motor vehicle and comprises an elongated platform and at least one base member connected to the elongated platform. The platform is adapted to be attached to the upper skirt of the C-shaped bumper fascia and has an upper surface and a lower surface, the upper surface being adapted for supporting the upper skirt of the C-shaped bumper fascia. The base member is adapted to be attached to the lower skirt of the C-shaped bumper fascia. A second embodiment is a bumper fascia support and reinforcement assembly for supporting and reinforcing a motor vehicle bumper fascia. The bumper fascia support and reinforcement assembly comprises an elongated bumper fascia support and an elongated reinforcement beam attached to the front side of the bumper fascia support so that the bumper fascia support is longitudinally-aligned with the reinforcement beam. A third embodiment is a bumper assembly for a motor vehicle having an elongated bumper fascia, an elongated bumper fascia support, and an elongated reinforcement beam.

17 Claims, 3 Drawing Sheets

BUMPER FASCIA SUPPORT, BUMPER FASCIA SUPPORT AND REINFORCEMENT ASSEMBLY, AND BUMPER ASSEMBLY

BACKGROUND OF THE INVENTION

1. Field of the Invention

The present invention relates generally to bumper fascia supports for motor vehicle bumper fascias, to bumper fascia support and reinforcement assemblies, and to bumper assemblies.

2. Description of the Related Art

In motor vehicles, bumper assemblies are employed to protect the vehicle body from minor bumps and typically include a flexible bumper fascia (which is the portion of the bumper assembly seen by the consumer) and other parts for supporting and reinforcing the bumper fascia. Not only does the bumper assembly need to protect the vehicle body from minor bumps, it is also desirable that the bumper assembly be aesthetically-pleasing to the consumer as well. To achieve this, the bumper fascia should have a smooth, unblemished surface.

It is also preferred that the bumper assembly be made and assembled to the vehicle at a low cost, which usually coincides with requiring minimum manual labor. To minimize manual labor, it is desirable that the bumper assembly be assembled to the vehicle by automation as much as possible. In some current bumper assemblies, several attachment projections are provided on the bumper fascia and are used for attaching the bumper fascia to a bumper fascia support. The attachment projections, commonly called "tabs", have to be manually bent to be attached to the bumper fascia support. Since there are usually several tabs on these types of bumper fascias, at least three operators are required at one time to attach the bumper fascia to the bumper fascia support. It is, therefore, preferred that a bumper assembly be designed having a bumper fascia with a minimum of tabs.

It is also advantageous if the parts of the bumper assembly can be molded and require minimum use of tooling equipment, since tooling equipment is relatively expensive and often causes blemish lines in the parts.

SUMMARY OF THE INVENTION

It is, therefore, one object of the present invention to provide parts for forming a bumper assembly for a motor vehicle, and to provide the bumper assembly itself, which bumper assembly would function to protect the vehicle body from minor bumps.

It is another object of the present invention to provide a bumper assembly for a motor vehicle which includes an aesthetically-pleasing bumper fascia having a smooth surface with a minimum of surface blemishes.

It is yet another object of the present invention to provide parts for forming a bumper assembly which are made and assembled using a minimum of labor and a minimum of tooling.

To achieve the foregoing objects, one embodiment of the present invention is a bumper fascia support for supporting a motor vehicle bumper fascia wherein the bumper fascia generally has a C-shaped transverse cross-section with an upper skirt and a lower skirt. The bumper fascia support has a front side and a back side relative to its position on the motor vehicle and comprises an elongated platform and at least one base member connected to the elongated platform. The platform is adapted to be attached to the upper skirt of the C-shaped bumper fascia and has an upper surface and a lower surface, the upper surface being adapted for supporting the upper skirt of the C-shaped bumper fascia. The base member is adapted to be attached to the lower skirt of the C-shaped bumper fascia.

A second embodiment of the present invention is a bumper fascia support and reinforcement assembly for supporting and reinforcing a motor vehicle bumper fascia. Again, the bumper fascia generally has a C-shaped transverse cross-section with an upper skirt and a lower skirt. The bumper fascia support and reinforcement assembly comprises an elongated bumper fascia support and an elongated reinforcement beam attached to the front side of the bumper fascia support so that the bumper fascia support is longitudinally-aligned with the reinforcement beam. The bumper fascia support is as described above for the first embodiment of the present invention.

A third embodiment of the present invention is a bumper assembly for a motor vehicle comprising an elongated bumper fascia generally having a C-shaped transverse cross-section with an upper skirt and a lower skirt, an elongated bumper fascia support, and an elongated reinforcement beam. The elongated bumper fascia support has a front side and a back side relative to its position on the motor vehicle and an elongated platform having an upper surface and a lower surface, the upper surface supporting the upper skirt of the C-shaped bumper fascia. The elongated platform is attached to the upper skirt of the C-shaped bumper fascia so that the C-shaped bumper fascia is longitudinally-aligned with and on the front side of the bumper fascia support. The bumper fascia support further has at least one base member connected to the elongated platform and attached to the lower skirt of the C-shaped bumper fascia. The reinforcement beam is attached to the front side of the bumper fascia support so that the reinforcement beam is longitudinally-aligned with the bumper fascia support and is between the bumper fascia support and the C-shaped bumper fascia.

Other objects, features, and advantages of the present invention will be readily appreciated as the same becomes better understood after reading the subsequent description taken in conjunction with the appendant drawings.

DESCRIPTION OF THE PREFERRED EMBODIMENT(S)

Figure 1:
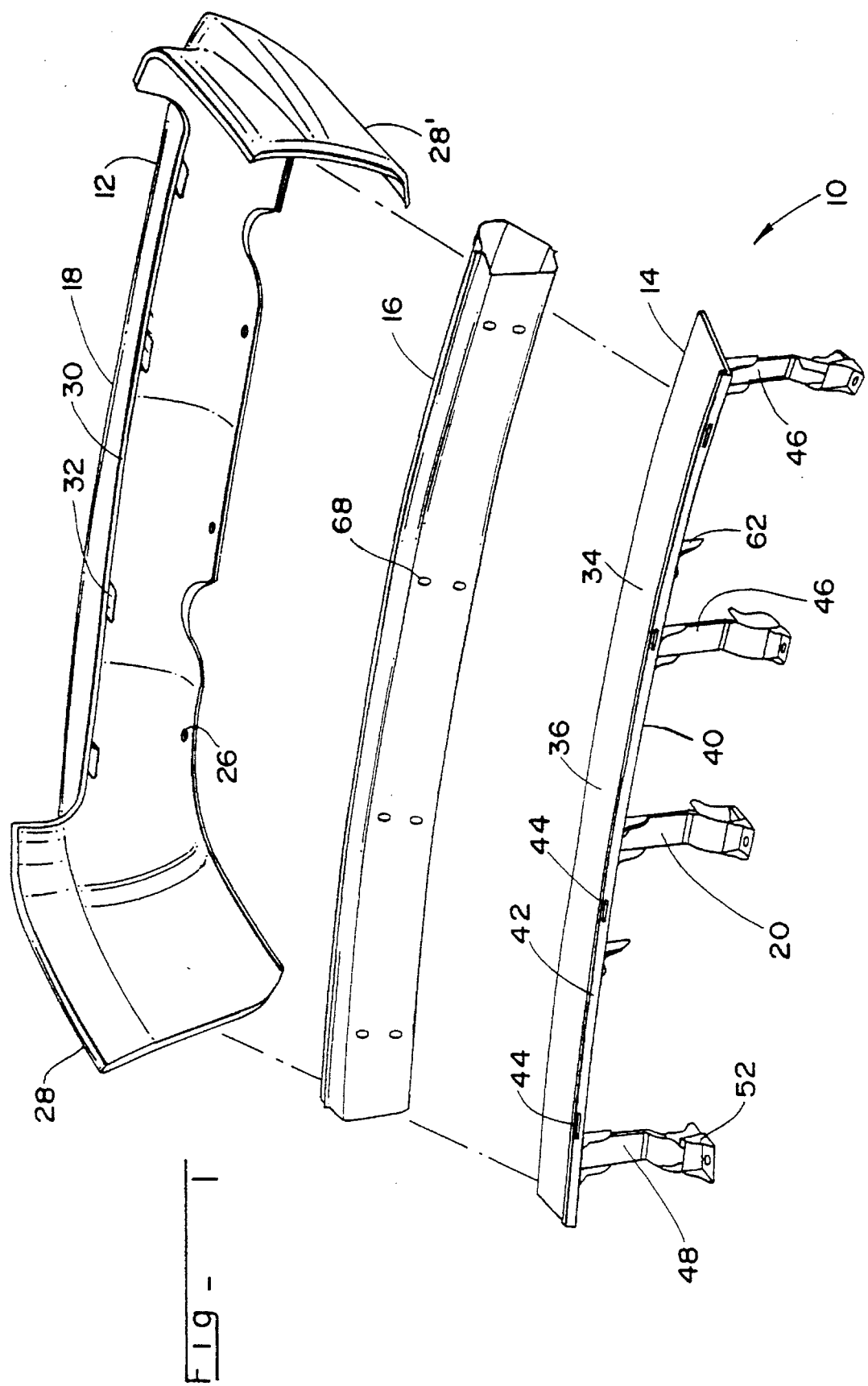
FIG. 1 is an exploded perspective view of a bumper assembly of the present invention.

Referring to FIG. 1, an unassembled bumper assembly 10 is shown including bumper fascia 12, bumper fascia support 14, and reinforcement beam 16. Although the bumper parts and bumper assembly of this invention may be used on the front or rear of a motor vehicle, for ease of description, side 18 of bumper assembly 10, and of its various parts, will be referred to as front side 18 and side 20 of bumper assembly 10 will be referred to as back side 20.

Bumper fascia 12, which is the visible part of bumper assembly 10 when assembled onto a motor vehicle, is an elongated part having a generally C-shaped transverse cross-section having upper skirt 22 and lower skirt 24. Lower skirt 24 has holes 26 therethrough, the purpose of which will be discussed below. Bumper fascia 12 is also L-shaped at each end 28 and 28' which extends over the corresponding ends of bumper fascia support 12 and reinforcing beam 16 and along a portion of the vehicle body when the bumper assembly is attached to the vehicle body. L-shaped ends 28 and 28' are, however, optional in the present invention. Upper skirt 22 of bumper fascia 12 has terminating edge 30 and projections 32 extending outwardly from terminating edge 30 and directed toward back side 20 of bumper assembly 10.

Bumper fascia 12 is typically formed of a flexible, elastomeric material, such as a thermoplastic olefin material, and may be formed by injection molding techniques.

Bumper fascia support 14 is an elongated member having elongated platform 34 on the top thereof. Platform 34 has upper surface 36, lower surface 38, and back edge 40. Platform 34 is present to support upper skirt 22 of bumper fascia 12 so that upper skirt 22 does not sag along its surface. Bumper fascia support 14 further has upwardly-extending ridge 42 near and parallel with back edge 40 of platform 34. Ridge 42 may be continuous or discontinuous along back edge 40, but is shown as being continuous. Ridge 42 has a plurality of slots 44 extending therethrough, which slots are generally horizontal.

Bumper fascia support 14 also has a plurality of spaced-apart leg members 46 connected to and downwardly-extending from lower surface 38 of platform 34. Leg members 46 include shank portion 48 having locking snaps 50 thereon directed toward the front side 18 of the bumper assembly. At the bottom ends of leg members 46 are base members 52 with forward extensions 54 and backward extensions 56. Backward extensions 56 have holes 58 therethrough for accepting attachment means, such as a bolt.

Also connected to lower surface 38 of platform 34 are reinforcing spacers 62. Reinforcing spacers 62 are present to keep bumper fascia support 14 from sagging and to maintain spacing between bumper fascia support 14 and reinforcement beam 16. Bumper fascia support 14 is typically formed of an elastomeric material, such as a thermoplastic olefin material, and may be formed by injection molding techniques.

Reinforcement beam 16 is a hollow elongated member generally having a rectangular transverse cross-section and is typically present to provide substantial resistance to impacts to the motor vehicle. Reinforcement beam 16 has a plurality of voids 64 on the front side thereof to reduce the weight of the part. Reinforcement beam 16 also has welding flanges 66 on the top and bottom thereof, as reinforcement beam 16 is typically formed by welding two metal structures together.

Reinforcement beam 16 also has apertures 68 on the back side thereof. When bumper fascia support 14 is assembled with reinforcement beam 16, apertures 68 in reinforcement beam 16 align with locking snaps 50 on bumper fascia support 14 providing a way to attach bumper fascia support 14 to reinforcement beam 16.

The dot-dash lines in FIG. 1 indicate how bumper assembly 10 is assembled, that is, when assembled, reinforcement beam 16 is between bumper fascia 12 and bumper fascia support 14. Bumper assembly 10 fully assembled is shown in part in FIG. 2.

Figure 2:
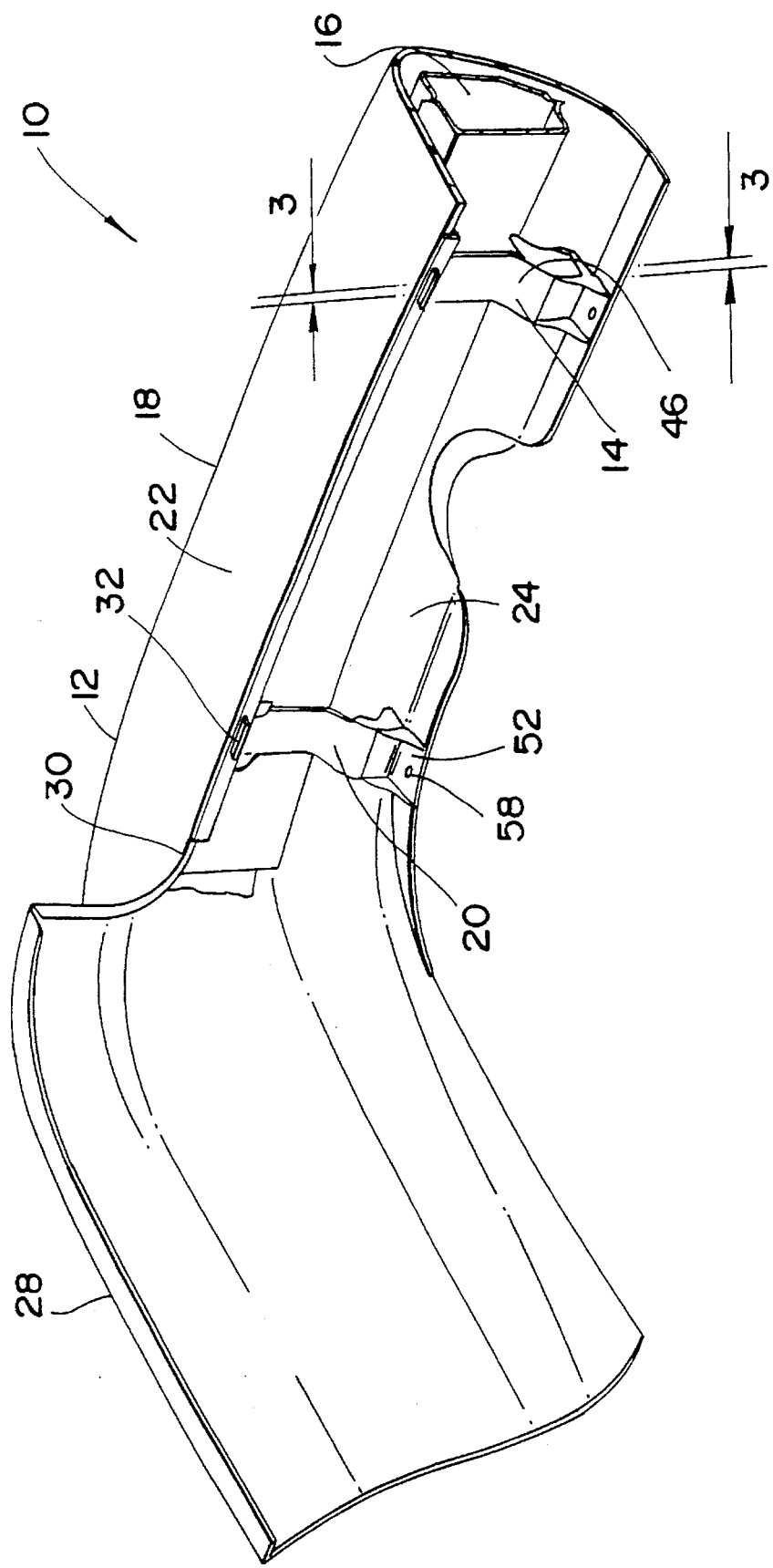
FIG. 2 is a perspective view of an assembled partial bumper assembly of the present invention.
Figure 3:
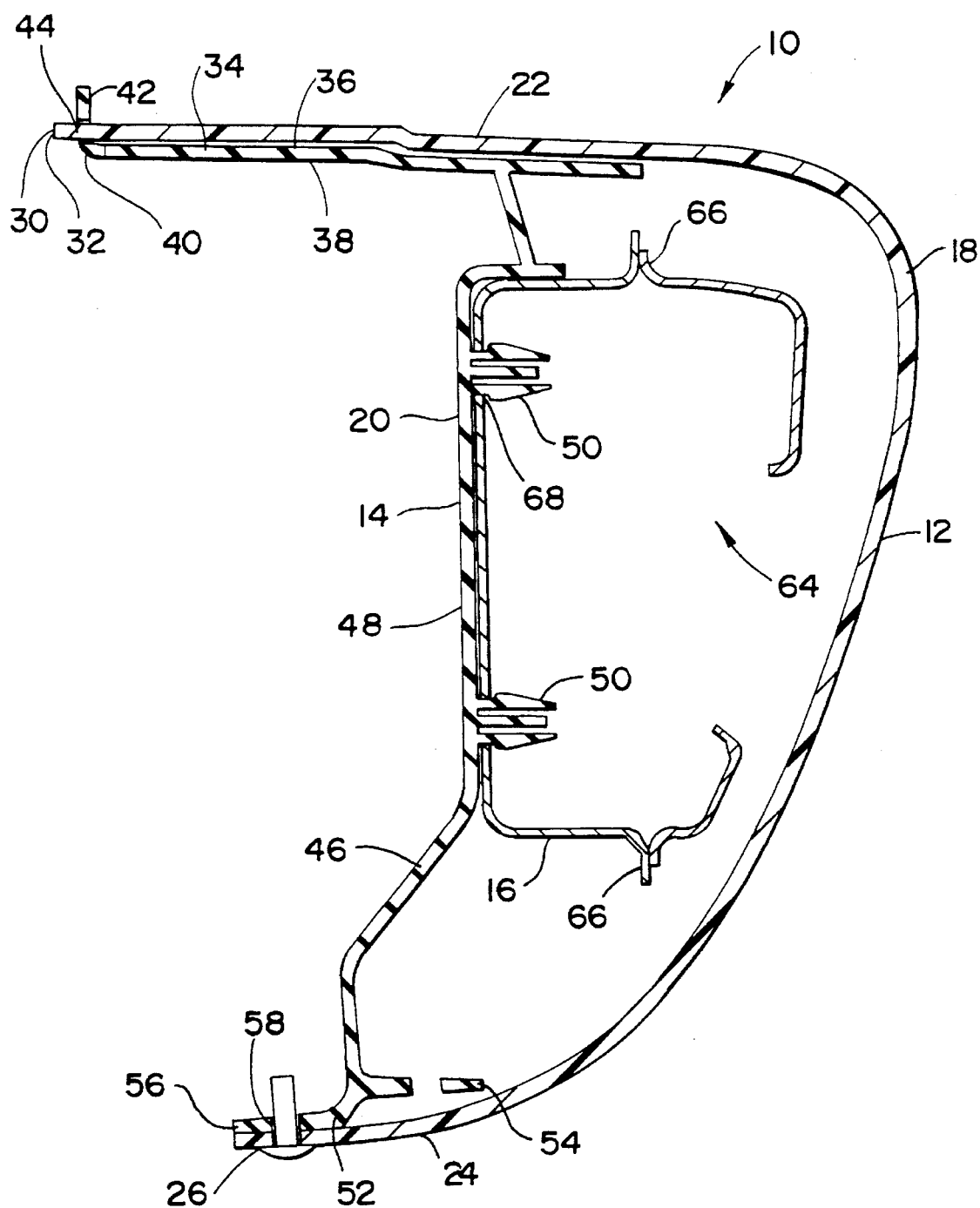
FIG. 3 is a sectional view of the slice defined between lines 3—3 of FIG. 2.

FIG. 3 shows a transverse cross-sectional view of assembled bumper assembly 10, the cross-section being a slice between lines 3—3 of FIG. 2. As shown, locking snaps 50 of bumper fascia support 14 is locked into apertures 68 in reinforcement beam 16 to attach reinforcement beam 16 to the front side of bumper fascia support 14. The locking mechanism between bumper fascia support 14 and reinforcement beam 16, that is, locking snaps 50 and apertures 68, has the advantage that no extraneous fasteners are required to attach the two parts together.

Also as shown in FIG. 3, projection 32 on bumper fascia 12 is inserted into slot 44 of bumper fascia support 14 to attach platform 34 of bumper fascia support 14 to upper skirt 22 of bumper fascia 12. The bottom surface of base member 52 of bumper fascia support 14 abuts against the top surface of lower skirt 24 of bumper fascia 12 and hole 58 in base member 52 aligns with hole 26 in lower skirt 24 so that attachment means, such as a bolt, may be inserted through holes 58 and 26 to fasten base member 52 to lower skirt 24.

To attach bumper assembly 10 to a motor vehicle, bumper fascia support 14 and reinforcement beam 16 are first fastened together as described hereinabove. Then, reinforcement beam 16 may be bolted to a vehicle body, e.g., by bolting each end of the reinforcement beam to the vehicle body. Bumper fascia 12 is then attached to the bumper fascia support/reinforcement beam assembly by sliding projections 32 on bumper fascia 12 into slots 44 in bumper fascia support 14 and fastening base members 52 to lower skirt 24 as described hereinabove.

Accordingly, the bumper fascia support, the reinforcement beam, and the bumper fascia of the present invention are useful for forming a bumper assembly for a motor vehicle which functions to protect the vehicle body from minor bumps. The bumper assembly of the present invention provides an aesthetically-pleasing bumper fascia having a smooth surface with a minimum of surface blemishes because the bumper fascia of the present invention requires a minimum of tooling to be formed and is well-supported by the bumper fascia support of the present invention. Each of the parts of the present invention for forming the bumper assembly of the present invention are made and assembled using a minimum of labor and a minimum of tooling. To assemble the bumper assembly of the present invention, no parts require manual bending, as in previous bumper assemblies.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claim is:

1. A bumper fascia support for supporting a motor vehicle bumper fascia, the bumper fascia generally having a C-shaped transverse cross-section with an upper skirt and a lower skirt, the bumper fascia support having a front side and a back side relative to its position on the motor vehicle, the bumper fascia support comprising:

a horizontally elongated platform having an upper surface, a lower surface, and a back edge, the platform being adapted for slide-together attachment to the upper skirt of the C-shaped bumper fascia, the upper surface being adapted for supporting the upper skirt of the C-shaped bumper fascia;

a plurality of Spaced-apart leg members each downwardly-extending from and integral with the platform; and at least one base member integrally connected to the bottom of the plurality of spaced-apart leg members, the base member having a hole therein for insertion of attachment means therethrough for attaching the base member to the lower skirt of the C-shaped bumper fascia.

2. The bumper fascia support of claim 1, wherein the elongated platform further comprises an upwardly-extending ridge near the back edge, the ridge having a slot therein.

3. A bumper fascia support for supporting a motor vehicle bumper fascia, the bumper fascia generally having a C-shaped transverse cross-section with an upper skirt and a lower skirt, the bumper fascia support having a front side and a back side relative to its position on the motor vehicle, the bumper fascia support comprising:

a horizontally elongated platform having an upper surface, a lower surface, a back edge and an upwardly-extending ridge near the back edge, the ridge having a slot therein for slide-together attachment to the upper skirt of the C-shaped bumper fascia, the upper surface of the platform being adapted for supporting the upper skirt of the C-shaped bumper fascia;

a plurality of base members connected to the elongated platform, the base members each having a hole therein for insertion of attachment means therethrough for attaching each base member to the lower skirt of the C-shaped bumper fascia; and a plurality of spaced-apart leg members each downwardly-extending from and integral with the platform and integrally connected at the bottom thereof to one of the base members, there being one base member for every spaced-apart leg member.

4. A bumper fascia support and reinforcement assembly for supporting and reinforcing a motor vehicle bumper fascia, the bumper fascia generally having a C-shaped transverse cross-section with an upper skirt and a lower skirt, the bumper fascia support and reinforcement assembly comprising:

an elongated bumper fascia support having a front side and a back side relative to its position on the motor vehicle, the bumper fascia support including a horizontally elongated platform having an upper surface, a lower surface, and a back edge, the platform being adapted for slide-together attachment to the upper skirt of the C-shaped bumper fascia, the upper surface being adapted for supporting the upper skirt of the C-shaped bumper fascia, the bumper fascia support further having at least one base member and a plurality of spaced-apart leg members, the at least one base member being connected to the elongated platform and having a hole therein for insertion of attachment means therethrough for attaching the at least one base member to the lower skirt of the C-shaped bumper fascia, the plurality of spaced-apart leg members each downwardly-extending from and integral with the platform and integrally connected at the bottom thereof to the at least one base member; and an elongated reinforcement beam attachable to the front side of the bumper fascia support so that the bumper fascia support is longitudinally-aligned with the reinforcement beam.

5. The bumper fascia support and reinforcement assembly of claim 4, wherein the elongated platform has an upwardly-extending ridge near the back edge, the ridge having a slot therein.

6. The bumper fascia support and reinforcement assembly of claim 4, wherein the reinforcement beam has a hollow, generally rectangular transverse cross-section.

7. The bumper fascia support and reinforcement assembly of claim 4, wherein the spaced-apart leg members are attachable to the reinforcing beam.

8. A bumper fascia support and reinforcement assembly for supporting and reinforcing a motor vehicle bumper fascia, the bumper fascia generally having a C-shaped transverse cross-section with an upper skirt and a lower skirt, the bumper fascia support and reinforcement assembly comprising:

a bumper fascia support having a front side and a back side relative to its position on the motor vehicle, the bumper fascia support including a horizontally elongated platform, a plurality of base members connected to the elongated platform, and a plurality of spaced-apart leg members each downwardly-extending from and integral with the platform and integrally connected at the bottom thereof to one of the base members, there being one base member for every spaced-apart leg member, the platform having an upper surface, a lower surface, a back edge and an upwardly-extending ridge near the back edge, the ridge having a slot therein to allow for slide-together attachment to the upper skirt of the C-shaped bumper fascia, the upper surface of the platform being adapted for supporting the upper skirt of the C-shaped bumper fascia, the base members each having a hole therein for insertion of attachment means therethrough for attaching the base members to the lower skirt of the C-shaped bumper fascia; and an elongated reinforcement beam attachable to the front side of the bumper fascia support at the spaced-apart leg members so that the bumper fascia support is longitudinally-aligned with the reinforcement beam, the reinforcement beam having a hollow, generally rectangular transverse cross-section.

9. A bumper assembly for a motor vehicle, comprising:

an elongated bumper fascia generally having a C-shaped transverse cross-section with an upper skirt and a lower skirt;

an elongated bumper fascia support having a front side and a back side relative to its position on the motor vehicle and a horizontally elongated platform having an upper surface, a lower surface, and a back edge, the upper surface for supporting the upper skirt of the C-shaped bumper fascia, the elongated platform being adapted for slide-together attachment to the upper skirt of the C-shaped bumper fascia so that the C-shaped bumper fascia is longitudinally-alignable with and on the front side of the bumper fascia support, the bumper fascia support further having a plurality of spaced-apart leg members and at least one base member, the plurality of spaced-apart leg members each downwardly-extending from and integral with the platform, the at least one base member integrally connected to the bottom of the plurality of spaced-apart leg members and having a hole therein for insertion of attachment means therethrough for attaching the at least one base member to the lower skirt of the C-shaped bumper fascia; and an elongated reinforcement beam attachable to the front side of the bumper fascia support so that the reinforcement beam is longitudinally-alignable with the bumper fascia support between the bumper fascia support and the C-shaped bumper fascia.

10. The bumper assembly of claim 9, wherein the elongated platform has a ridge near the back edge, the ridge has a slot therein, and the C-shaped bumper fascia has a projection on the upper skirt thereof insertable into the slot in the bumper fascia support.

11. The bumper assembly of claim 9, wherein the lower skirt of the C-shaped bumper fascia has a hole therein alignable with the hole in the base member.

12. The bumper assembly of claim 9, wherein the reinforcement beam has a hollow, generally rectangular transverse cross-section.

13. The bumper assembly of claim 9, wherein the spaced-apart leg members are attachable to the reinforcing beam.

14. A bumper assembly for a motor vehicle, comprising:

an elongated bumper fascia generally having a C-shaped transverse cross-section with an upper skirt having a projection thereon and a lower skirt having a plurality of holes therein;

an elongated bumper fascia support having a front side and a back side relative to its position on the motor vehicle and a horizontally elongated platform having an upper surface, a lower surface, a back edge, and a ridge near the back edge, the ridge having a slot therein, the projection on the C-shaped bumper fascia being insertable into the slot in the bumper fascia support so that the C-shaped bumper fascia is attachable to the front side of and longitudinally-alignable with the bumper fascia support, the upper surface of the platform for supporting the upper skirt of the C-shaped bumper fascia, the bumper fascia support further having a plurality of base members connected to the elongated platform, the base members each having a hole therein aligned with one of the holes in the lower skirt of the C-shaped bumper fascia, the holes being present for insertion of attachment means therethrough for attaching the base member to the lower skirt of the C-shaped bumper fascia, and the bumper fascia support further having a plurality of spaced-apart leg members each downwardly-extending from and integral with the platform and integrally connected at the bottom thereof to one of the base members, there being one base member for every spaced-apart leg member; and an elongated reinforcement beam attachable to the front side of the bumper fascia support at the leg-members so that the reinforcement beam is longitudinally-alignable with the bumper fascia support between the bumper fascia support and the C-shaped bumper fascia, the reinforcement beam having a hollow, generally rectangular transverse cross-section.

15. The bumper fascia support of claim 1, wherein there is one base member for every spaced-apart leg member.

16. The bumper fascia support and reinforcement assembly of claim 4, wherein there is one base member for every spaced-apart leg member.

17. The bumper assembly of claim 9, wherein there is one base member for every spaced-apart leg member.

* * * * *